(12) United States Patent
Chaudhary

(10) Patent No.: US 10,557,023 B2
(45) Date of Patent: Feb. 11, 2020

(54) CABLE INSULATION COMPRISING A BLEND OF LDPE AND POLYPROPYLENE

(71) Applicant: Dow Global Technologies LLC, Midland, MI (US)

(72) Inventor: Bharat I. Chaudhary, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 23 days.

(21) Appl. No.: 15/577,869

(22) PCT Filed: May 24, 2016

(86) PCT No.: PCT/US2016/033879
§ 371 (c)(1),
(2) Date: Nov. 29, 2017

(87) PCT Pub. No.: WO2016/200600
PCT Pub. Date: Dec. 15, 2016

(65) Prior Publication Data
US 2018/0134882 A1    May 17, 2018

Related U.S. Application Data

(60) Provisional application No. 62/174,016, filed on Jun. 11, 2015.

(51) Int. Cl.
| | |
|---|---|
| *C08L 23/06* | (2006.01) |
| *C08L 23/12* | (2006.01) |
| *C08L 23/16* | (2006.01) |
| *C08K 5/14* | (2006.01) |
| *H01B 3/44* | (2006.01) |

(52) U.S. Cl.
CPC .............. *C08L 23/06* (2013.01); *C08K 5/14* (2013.01); *C08L 23/12* (2013.01); *C08L 23/16* (2013.01); *H01B 3/441* (2013.01); *C08L 2203/202* (2013.01); *C08L 2207/02* (2013.01); *C08L 2207/066* (2013.01)

(58) Field of Classification Search
CPC .......... C08L 23/06; C08L 23/12; C08L 23/16; C08L 2203/202; C08L 2207/066; H01B 3/441; C08K 5/14
See application file for complete search history.

(56) References Cited

U.S. PATENT DOCUMENTS

| | | |
|---|---|---|
| 4,018,852 A | 4/1977 | Schober |
| 5,346,961 A | 9/1994 | Shaw et al. |
| 8,912,297 B2 | 12/2014 | Flory et al. |
| 2016/0152807 A1 | 6/2016 | Chaudhary et al. |

FOREIGN PATENT DOCUMENTS

| | | | |
|---|---|---|---|
| WO | 2013/078351 A1 | 5/2013 | |
| WO | WO 2013/078351 A1 * | 5/2013 | ............. C08L 23/00 |

OTHER PUBLICATIONS

T. Williams, et al., J. Polym. Sci., Polym. Let., vol. 6, 1968, p. 621-624.

\* cited by examiner

*Primary Examiner* — Robert D Harlan
(74) *Attorney, Agent, or Firm* — Quarles & Brady LLP

(57) ABSTRACT

Compositions useful for the manufacture of cable insulation sheaths comprise, in weight percent based on the weight of the composition: (A) 85 to 99% low density polyethylene (LDPE) having a crystallinity of greater than 40%; (B) 1 to less than 14% propylene polymer having an upper melting point of greater than or equal to ($\geq$) 130° C.; and (C) $\geq$0.5% peroxide.

8 Claims, No Drawings

CABLE INSULATION COMPRISING A BLEND OF LDPE AND POLYPROPYLENE

FIELD OF THE INVENTION

This invention relates to cable insulation. In one aspect the invention relates to cable insulation comprising a blend of low density polyethylene (LDPE) and polypropylene while in another aspect, the invention relates to crosslinked cable insulation.

BACKGROUND OF THE INVENTION

Crosslinked medium- to extra-high voltage power cables are predominantly made from low density polyethylene (LDPE), and the compositions need to exhibit sufficiently high melt extensional viscosity for sag-resistance during extrusion. This property is affected by the molecular architecture (molecular weight and polydispersity) of the LDPE. However, this approach often requires the use of different grades of LDPE. Another concept (employed with flexible ethylene-propylene rubber (EPR) cables) is to use clay as a filler to enhance sag-resistance, but the resulting dissipation factors are very high. It is desirable to identify additive approaches for enhancing melt extensional viscosity of LDPE during cable extrusion, with dissipation factor remaining satisfactorily low.

WO 2015/009562 teaches a composition comprising in weight percent based on the weight of the composition:
(A) 60-95% of an ethylene polymer of crystallinity of less than 40 percent;
(B) 4 to less than 40% of a propylene polymer with an upper melting point of greater than or equal to ($\geq$) 130° C.; and
(C) $\geq$0.5% peroxide;

with the proviso that the ethylene polymer either comprises a continuous phase (matrix) within which the propylene polymer is dispersed or is co-continuous with the propylene polymer. This teaching, however, does not disclose that the ethylene polymer is LDPE with a crystallinity of greater than 40%, and that as little as 1% of the propylene polymer in the composition is sufficient to enhance melt extensional viscosity at extrusion conditions, while minimizing any increases in flexural modulus and/or melt shear viscosity of the resulting composition.

SUMMARY OF THE INVENTION

In one embodiment the invention is a composition comprising a blend of LDPE and polypropylene. In one embodiment the invention is cable insulation made from the composition. In one embodiment the invention is a cable comprising cable insulation made from the composition. In one embodiment the cable insulation is crosslinked. The use of minor amounts of polypropylene in blends with LDPE enhances the extensional viscosity at cable extrusion conditions, while retaining satisfactory: (i) shear viscosity; (ii) degree of ultimate crosslinking with peroxides; and (iii) dissipation factor.

In one embodiment the invention is a composition comprising, in weight percent based on the weight of the composition:
(A) 85 to 99% low density polyethylene (LDPE) having a crystallinity of greater than 40%;
(B) 1 to less than 14% propylene polymer having an upper melting point of greater than or equal to ($\geq$) 130° C.; and
(C) $\geq$0.5% peroxide.

In one embodiment the invention is cable insulation made from the composition. In one embodiment the invention is a cable comprising cable insulation made from the composition. In one embodiment the cable insulation is crosslinked.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of the individual components in the composition.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc. excepting those that are not essential to the performance, operability or the like of the composition, process, etc. The term "consisting of" excludes from a composition, process, etc., any component, step, etc. not specifically disclosed. The term "or", unless stated otherwise, refers to the disclosed members individually as well as in any combination.

"Cable", "power cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Electrical insulation applications are generally divided into low voltage insulation which are those less than 1 kV (one thousand volts), medium voltage insulation which ranges from 1 kV to 30 kV, high voltage insulation which ranges from 30 kV to 150 kV, and extra high voltage insulation which is for applications above 150 kV (as defined by the IEC, the International Electrotechnical Commission). Typical cable designs are illustrated in U.S. Pat. Nos. 5,246,783; 6,496,629 and 6,714,707.

"Polymer" means a compound prepared by polymerizing monomers, whether of the same or a different type. The generic term polymer thus embraces the term homopolymer, usually employed to refer to polymers prepared from only one type of monomer, and the terms "interpolymer" and "copolymer".

"Interpolymer", "copolymer" and like terms means a polymer prepared by the polymerization of at least two different types of monomers. These generic terms include copolymers, usually employed to refer to polymers prepared from two different types of monomers, and polymers prepared from more than two different types of monomers, e.g., terpolymers, tetrapolymers, etc. The "interpolymer" or "copolymer" may be made by copolymerization in a reactor or by post-reactor modification (to make graft copolymer, such as by reactive extrusion optionally initiated or accelerated with peroxides or catalysts).

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

LDPE

Low density polyethylene (LDPE), as here used, is a homopolymer of ethylene or an interpolymer of ethylene and less than 7 wt %, preferably less than 3 wt %, of one or more polymerizable comonomers including (but not limited to) unsaturated esters and hydrolyzable silane monomers.

LDPE used in the practice of this invention can be prepared by any known or hereafter discovered high-pressure reactor process, using any conventional or hereafter discovered conditions and techniques.

High-pressure processes are typically free-radical-initiated polymerizations and conducted in a tubular reactor or a stirred autoclave or a combination of the two. In a tubular reactor, the pressure can be in the range of from 25,000 to 45,000 pounds per square inch (psi), and the temperature can be in the range of from 200 to 350° C. In a stirred autoclave, the pressure can be in the range of from 10,000 to 30,000 psi, and the temperature can be in the range of from 175 to 250° C.

Interpolymers comprised of ethylene, unsaturated esters and/or hydrolyzable silane monomers are well known and can be prepared by conventional high-pressure processes or post-reactor modification. In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms.

Examples of acrylates and methacrylates include, but are not limited to, ethyl acrylate, methyl acrylate, methyl methacrylate, t-butyl acrylate, n-butyl acrylate, n-butyl methacrylate, and 2-ethylhexyl acrylate. Examples of vinyl carboxylates include, but are not limited to, vinyl acetate, vinyl propionate, and vinyl butanoate.

Hydrolyzable silane monomers can be any hydrolyzable silane monomer that will effectively copolymerize with an olefin (e.g., ethylene), or graft to and crosslink an olefin (e.g., ethylene) polymer. Those described by the following formula are exemplary:

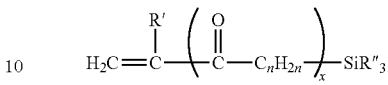

in which R' is a hydrogen atom or methyl group; x is 0 or 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), an aryloxy group (e.g. phenoxy), an araloxy group (e.g. benzyloxy), an aliphatic acyloxy group having from 1 to 12 carbon atoms (e.g. formyloxy, acetyloxy, propanoyloxy), an amino or substituted amino group (alkylamino, arylamino), or a lower-alkyl group having 1 to 6 carbon atoms inclusive, with the proviso that not more than one of the three R" groups is an alkyl. Such silanes may be copolymerized with ethylene in a reactor, such as a high-pressure process. Such silanes may also be grafted to a suitable ethylene polymer by the use of a suitable quantity of organic peroxide. Suitable silanes include unsaturated silanes that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Suitable hydrolyzable silane monomers include, but are not limited to, vinyltrimethoxysilane (VTMS), vinyltriethoxysilane (VTES), vinyltriacetoxysilane, and gamma-(meth)acryloxy propyl trimethoxy silane.

In one embodiment, the low density polyethylene (LDPE) is a tubular LDPE, i.e., it is made by a process in which at least one reactor is a tubular reactor.

In one embodiment the LDPE has a crystallinity greater than 40%, or 42%, or 44%, or 46%, or 48%, or 50%, or 52%, or 54%, or 56%. The percent crystallinity is determined by dividing the heat of fusion as determined by differential scanning calorimetry (DSC) of an LDPE by the total heat of fusion for a 100% crystalline sample of polyethylene. The total heat of fusion for high-density homopolymer polyethylene (100% crystalline) is 292 joule/gram (J/g). Heat of fusion is determined in accordance with ASTM D3418.

In one embodiment, the LDPE has a melt index ($I_2$) from 0.1 to 100 grams per 10 minutes (g/10 min), measured at 190° C./2.16 kg. In one embodiment, the LDPE has an $I_2$ from 0.3 to 100 g/10 min, or from 0.5 to 30 g/10 min, or from 1.0 to 10 g/10 min. In one embodiment, the LDPE has an $I_2$ from 0.3 to 100 g/10 min, or from 1 to 50 g/10 min, or from 2 to 20 g/10 min.

In one embodiment the LDPE has a polydispersity index ("PDI") (i.e., weight average molecular weight/number average molecular weight; "Mw/Mn;" or molecular weight distribution ("MWD")) from 3.5 to 15.0 ("conventional"

measurements) or 5.0 to 26.0 ("absolute" measurements) as determined by gel permeation chromatography.

In one embodiment the LDPE has a density greater than or equal to 0.910, or greater than or equal to 0.914, or greater than or equal to 0.916 grams per cubic centimeter (g/cc or g/cm$^3$).

In one embodiment the LDPE has a density less than or equal to 0.940, or less than or equal to 0.935, or less than or equal to 0.932, grams per cubic centimeter (g/cc or g/cm$^3$).

In one embodiment, the LDPE has a density from 0.910 to 0.940, or from 0.915 to 0.935, or from 0.916 to 0.932 g/cc.

Preferably, in one embodiment the LDPE has a density from 0.912 to 0.940, or from 0.915 to 0.935, or from 0.920 to 0.930, or from 0.918 to 0.926 g/cc.

In one embodiment, the LDPE has a density of from 0.916 to 0.940, or from 0.916 to 0.921, or from 0.920 to 0.924, or from 0.923 to 0.940.

In one embodiment, the LDPE has a density from 0.920 to 0.940 g/cc.

In one embodiment, the LDPE has terminal vinyls per 1000 carbon atoms from 0.01 to 1.0.

The LDPE used in the practice of this invention can be used alone or in combination with one or more other LDPE polymers, e.g., a blend of two or more LDPE polymers that differ from one another by monomer composition and content, method of preparation, etc. If the LDPE is a blend of two or more LDPE polymers, then the blend can be prepared by any in-reactor or post-reactor process.

Examples of LDPE that can be used in the practice of this invention include, but are not limited to, DXM-446 available from The Dow Chemical Company, BPD2000E available from INEOS Olefins and Polymers Europe, and LDPE 2102TX00 available from SABIC Europe.

Propylene Polymer

The "polypropylene" or "propylene polymer" used in the practice of this invention can be a homopolymer or one or more copolymers of units derived from propylene and up to 30 and preferably up to 20, mole percent ethylene and/or one or more other α-olefin having up to 20, preferably up to 12 and more preferably up to 8, carbon atoms. If a copolymer, it is typically random, block or graft. The propylene polymer may be a Ziegler-Natta catalyzed polymer, a metallocene-catalyzed polymer, or a constrained geometry catalyst catalyzed polymer, and may be made using gas phase, solution, or slurry polymer manufacturing processes. The propylene polymer may be a homopolymer or a blend of a homopolymer and one or more copolymers, or a blend of two or more copolymers. "Propylene homopolymer" and similar terms mean a polymer consisting solely or essentially all of units derived from propylene.

The molecular weight of the propylene polymer is conveniently indicated using a melt flow measurement according to ASTM D-1238 (Condition 230° C./2.16 kg (formerly known as "Condition (L)"). Melt flow rate is inversely proportional to the molecular weight of the polymer. Thus, the higher the molecular weight, the lower the melt flow rate, although the relationship is not linear. The melt flow rate for the polypropylene useful in the practice of this invention is generally between about 0.1 and 100, and more preferably between about 0.5 and 40. Examples of the polypropylene polymers useful in the practice of this invention are more fully described in *Modern Plastics Encyclopedia*/89, mid October 1988 Issue, Volume 65, Number 11, pp. 86-92.

The propylene polymer can be primarily isotactic or primarily syndiotactic. As here used with respect to the polypropylene homopolymer, the term "primarily" means greater than 60 percent. For example, a primarily syndiotactic polypropylene homopolymer can have greater than 60 percent racemo diads. In a preferred embodiment, the polypropylene homopolymer is primarily isotactic. In various embodiments, the polypropylene homopolymer can have at least 70, at least 80, at least 90, or at least 95 percent isotactic pentads as determined by $^{13}$C-nuclear magnetic resonance ("NMR") analysis.

In one embodiment the propylene polymer is a non-nucleated homo- or copolymer.

If the propylene polymer is a copolymer, e.g., a propylene-α-olefin interpolymer, then it is polymer of a propylene monomer copolymerized with one or more types of α-olefin comonomer. The α-olefin comonomer can be ethylene, a C$_{4-20}$ (i.e., a monomer having 4 to 20 carbon atoms) linear, branched or cyclic α-olefin, or mixtures of two or more thereof. Non-limiting examples of suitable C$_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in a α-olefin such as 3-cyclohexyl-1-propene (allyl cyclohexane) and vinyl cyclohexane. Illustrative propylene-α-olefin interpolymers include propylene/ethylene, propylene/butene, propylene/1-hexene, propylene/1-octene, ethylene/propylene/1-octene, ethylene/propylene/butene, and ethylene/propylene/diene monomer ("EPDM"). The propylene-α-olefin interpolymers can be random interpolymers. In one embodiment the α-olefin component of the propylene-α-olefin interpolymer is ethylene.

The polymerized α-olefin component of the propylene-α-olefin interpolymer can constitute from greater than 0 to up to 15 mole percent ("mol %"), or from 5 to 15 mol %, of the total propylene-α-olefin interpolymer. Polymerized propylene can constitute all or substantially all of the remainder of the propylene-α-olefin interpolymer.

In one embodiment the polypropylene homopolymer, impact copolymer or random copolymer can have a melt flow rate from 0.5 to 10 g/10 minutes ("min"), or from 1 to 5 g/10 min, as determined according to ASTM D-1238 (230° C./2.16 kg). Also, the polypropylene homopolymer, impact copolymer or random copolymer can have a polydispersity index ("PDI") (i.e., weight average molecular weight/number average molecular weight; "Mw/Mn;" or molecular weight distribution ("MWD")) from 2 to 12, or from 3 to 8, as determined by gel permeation chromatography.

Exemplary commercially available polypropylene homopolymers include BRASKEM PP H358-02, available from Braskem S.A. (São Paulo, Brazil); Braskem FF018F Polypropylene, available from Braskem; MOPLEN HP1073, available from LyondellBasell (Rotterdam, Netherlands); or PP525 P available from Sabic (Riyadh, Saudi Arabia).

In one embodiment the propylene-α-olefin interpolymer has a density from 0.855 to 0.90 g/cm$^3$, or from 0.86 to 0.88 g/cm$^3$, as determined according to ASTM D-792. The propylene-α-olefin interpolymer can have a melt flow rate from 0.5 to 10 g/10 min, or from 1 to 5 g/10 min, as determined according to ASTM D-1238 (230° C./2.16 kg). Also, the propylene-α-olefin interpolymer/ can have a PDI in the range of from 2 to 6, or in the range of from 2 to 4, as determined by gel permeation chromatography.

Exemplary commercially available propylene-α-olefin interpolymers include VERSIFY™ 2200 and 2400, each available from The Dow Chemical Company (Midland, Mich., USA); VISTAMAXX™ 3020 FL from ExxonMobil Chemical (Irving, Tex., USA); and TAFMER™ XM from Mitsui Chemicals (Tokyo, Japan).

Regardless if the propylene polymer is a homopolymer or interpolymer, it has an upper melting point of at least 130° C., preferably at least 135° C. and more preferably at least 140° C. as determined by differential scanning calorimetry (DSC). If the propylene polymer has only one melting point, that itself is the upper melting point. If the propylene polymer has more than one melting point, the upper value is the highest melting point detected by DSC. In one embodiment the propylene polymer is an impact copolymer polypropylene. As described in U.S. Pat. No. 6,492,465, typical propylene impact copolymers contain two phases or components, i.e., a homopolymer component and a copolymer component. These two components are usually produced in a sequential polymerization process in which the homopolymer is produced in a first reactor and then is transferred to a second reactor in which the copolymer is produced and incorporated into the matrix of the homopolymer. The copolymer has rubbery characteristics, and it provides desirable impact resistance. The homopolymer provides the overall stiffness.

Peroxide

Any peroxide that will promote the crosslinking of the composition of this invention can be used in the practice of this invention. Exemplary peroxides include dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexane-3; 1,1-bis(t-butylperoxy)3,3,5-trimethylcyclo-hexane; isopropylcumyl cumylperoxide; di(isopropylcumyl) peroxide; or mixtures thereof. Peroxide curing agents are used in amounts of at least 0.5 wt % based on the weight of the composition. In various embodiments the peroxide curing agent is used in an amount of 0.5-10, or 0.7-5 or 1-3 wt % based on the weight of the composition. The peroxides can be used alone or in combination with various other known curing co-agents, boosters, and retarders, such as triallyl isocyanurate; ethoxylated bisphenol A dimethacrylate; α-methyl styrene dimer (AMSD); and other co-agents described in U.S. Pat. Nos. 5,346,961 and 4,018,852.

Other Crosslinking Agents or Technologies

As an alternative, or in addition, to the use of peroxides for the crosslinking of the compositions of this invention, other approaches for crosslinking of polymers may be used to effect the desired degree of crosslinking. Such approaches and technologies are well known to those skilled in the art and include (but are not limited to) radiation crosslinking, moisture crosslinking, bisulfonyl azide crosslinking, and crosslinking with hydroxyl terminated polydimethylsiloxanes (PDMS), etc. In some cases, it would be necessary for the ethylene and/or propylene polymers used in the practice of this invention to be functionalized appropriately to enable crosslinking (for example, with alkoxy silanes in the case of moisture crosslinking or crosslinking with hydroxyl terminated PDMS).

Compatibilizer

In one embodiment the composition comprises a compatibilizer. In one embodiment, a preferred embodiment, the composition does not comprise a compatibilizer. The compatibilizer can be a polymer that is miscible or compatible with the ethylene and propylene polymers used to make the compositions of this invention. The definition of polymer blend compatibilization and the various approaches used is given in Utracki, L. A., *The Canadian Journal of Chemical Engineering*, Volume 80, December 2002, pages 1008 to 1016. If present, then the amount of compatibilizer in the composition, based on the weight of the composition, is typically less than 10 wt %, more typically less than 5 wt % and even more typically less than 3 wt %. Compatibilizer-free compositions comprise no more than trace amounts, (e.g., less than 0.1, preferably less than 0.01 wt % and even more preferably less than 0.001 wt %) of compatibilizer, and the typically less than that detectable using standard analytical techniques.

Additives

The compositions of the present invention can also comprise conventional additives. These optional components include, but are not limited to, antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, tree-retardants (e.g., polyethylene glycol, polar polyolefin copolymers, etc.), crosslinking agents, coagents, scorch retardants, cure boosters and metal deactivators. Fillers include (but are not limited to) carbon black, calcined clay and organo-clay. Additives can be used in amounts ranging from less than 0.01 to more than 10 wt % based on the weight of the composition. Typically, the total amount of additives in the composition is between 0.1 and 10 wt % based on the weight of the composition.

In one embodiment the polymers of this invention are treated with one or more stabilizers or antioxidants, such as IRGANOX™ 1010, IRGANOX™ 1076 and IRGAFOS™ 168. Optionally, the polymers are treated with one or more stabilizers or antioxidants before extrusion or other melt processes.

Composition

In one embodiment the composition of this invention comprises in weight percent based upon the weight of the composition:
 (A) 85 to 99%, preferably 86 to 99%, more preferably 89 to 98% and even more preferably 91 to 98% LDPE of crystallinity greater than 40 percent;
 (B) 1 to less than 14%, preferably 1 to less than 10%, more preferably 1 to less than 5% and even more preferably 1 to less than 3% propylene polymer with an upper melting point of at least 130° C., preferably an isotactic polypropylene;
 (C) At least 0.5%, preferably at least 0.7%, more preferably at least 1.0%, peroxide and even more preferably at least 1.5%, peroxide, preferably dicumyl peroxide;
 (D) Optionally a compatibilizer and if present, in an amount of 0.1 to less than 10%, preferably 0.5 to less than 5% and more preferably in an amount of 1 to less than 3%; and
 (D) Optionally one or more additives and if present, the total amount of additives present in an amount of 0.01 to more than 10%, preferably 0.1 to 10%.

The compositions of this invention, and particularly the propylene and/or LDPE polymer components, are preferably free or contain inconsequential amounts of water-soluble salts that can have deleterious effects on wet electrical properties. Examples include the various sodium salts, e.g., sodium benzoates that are often used as nucleating agents for polypropylene.

The components of the composition can be blended in any manner and using any equipment. Typically, the LDPE and propylene polymers are melted blended with one another in conventional mixing equipment, e.g., a BRABENDER™ batch mixer or extruder, to form a relatively homogeneous blend comprising a continuous or co-continuous LDPE phase or matrix with a continuous or discontinuous propylene polymer phase. The mixing or blending may be done at, below or above the upper melting temperature (point) of the propylene polymer. The peroxide and optional compatibilizer and additives can be added in any manner, including soaking and mixing. In one embodiment, the compatibilizer and additives are blended with one another and then added to the blended ethylene and propylene polymers. In one embodiment the optional components are added individually. In one embodiment one or more of the optional components are mixed with one or both of the ethylene and propylene polymers before the polymers are melt-blended with one another. In one embodiment one or more of the optional components are added as a masterbatch either to the blended polymers or to one or both of the polymers prior to melt blending. Typically, the peroxide is the last component to be added to the blended polymers although here too, it can be first soaked or mixed with one or both of the polymers prior to the melt blending of the polymers. In an embodiment, all the ingredients (including peroxide) are melt-blended in one step. In another embodiment, all the ingredients (including peroxide) are melt-blended in one step as part of the cable extrusion process, without a need to first prepare a compound prior to use during cable extrusion.

The composition has the following properties with the peroxide, with or without the optional compatibilizer and additives, i.e., before crosslinking: Shear viscosity (Pa s) at 100 rad s$^{-1}$ and 120° C. or 135° C. of less than or equal to ($\leq$) 1600, preferably $\leq$1300, most preferably $\leq$1000; and Extensional viscosity (Poise) at 135° C., 1/s and a Hencky strain of 1 of greater than or equal to ($\geq$) 5.0 E+05 poise, preferably $\geq$7.0 E+05 poise and most preferably $\geq$9 E+05 poise; and a maximum Hencky strain of greater than 1.0, preferably greater than 1.5 and most preferably greater than 2.0 at the same conditions.

The composition has the following crosslinking kinetics with the peroxide, with or without the optional compatibilizer and additives:
(1) A measure of scorch-resistance at extrusion conditions: ts1 (time for 1 lb-in increase in torque) at 140° C. $\geq$30 minutes, preferably $\geq$35 min, most preferably $\geq$40 min;
(2) A measure of crosslinkability in the continuous vulcanization step: MH (maximum torque at 182° C.)–ML (minimum torque at 182° C.) $\geq$0.7 lb-in, preferably $\geq$1.3 lb-in, most preferably $\geq$1.8 lb-in.

The composition has the following properties after crosslinking, with or without the optional compatibilizer and additives:
(1) Gel content $\geq$40%, preferably $\geq$50%, most preferably $\geq$60%;
(2) Flexural Modulus, 2% secant (MPa) less than or equal to ($\leq$) 220, preferably $\leq$200, most preferably $\leq$180;
(3) Hot creep (200° C.) $\leq$175%, preferably $\leq$125%, most preferably $\leq$100%;
(4) Dissipation factor (DF) at 130° C., 60 Hz $\leq$5%, preferably $\leq$2%, most preferably $\leq$1%; and
(5) AC breakdown strength (unaged and aged) $\geq$28 kV/mm, preferably $\geq$29 kV/mm, most preferably $\geq$30 kV/mm.

Insulation Sheath

The compositions of this invention are well suited for conductor coating applications, and conductor insulating layers in particular. In one embodiment the invention is an insulation sheath for a conductor. In one embodiment the invention is a conductor comprising an insulation sheath made from the composition of the invention. A "conductor" is an element of elongated shape (wire, cable, fiber) for transferring energy at any voltage (DC, AC, or transient). The conductor is typically at least one metal wire or at least one metal cable (such as aluminum or copper) but may be optical fiber. The conductor may be a single cable or a plurality of cables bound together (i.e., a cable core, or a core).

The process for producing a coated conductor includes heating a composition of this invention to at least the melting temperature of the LDPE and then extruding the polymer melt blend onto the conductor. The term "onto" includes direct contact or indirect contact between the polymer melt blend and the conductor. The polymer melt blend is in an extrudable state.

The coating is located on the conductor. The coating may be one or more inner layers such as an insulating layer. The coating may wholly or partially cover or otherwise surround or encase the conductor. The coating may be the sole component surrounding the conductor. Alternatively, the coating may be one layer of a multilayer jacket or sheath encasing the metal conductor.

The coating is crosslinked. In one embodiment crosslinking of the composition begins in the extruder but only to a minimal extent. In one embodiment crosslinking is delayed until the composition is extruded upon the conductor. Crosslinking of the composition can be initiated and/or accelerated through the application of heat or radiation. Once on the conductor, the composition is crosslinked to at least a 40%, preferably to at least a 50% and more preferably to at least a 60%, gel content level as measured by the procedure described in the examples.

The coated conductor prepared by the process described above is flexible Non-limiting examples of suitable coated conductors include flexible wiring such as wiring for consumer electronics, a power cable, a power charger wire for cell phones and/or computers, computer data cords, power cords, appliance wiring material, and consumer electronic accessory cords.

In one embodiment the invention is a wire or cable comprising an insulation sheath made from the composition of this invention. In one embodiment the composition is melt-shaped into an article other than a coating on a conductor, e.g., an electrical connector or a component of an electrical connector.

Other Fabricated Articles

The compositions of this invention may also be used to make other fabricated articles (such as foams), by melt mixing and crosslinking processes known to those skilled in the art, including (but not limited to) extrusion, injection molding, continuous vulcanization, etc.

EXAMPLES

Test Methods

Density is measured according to ASTM D-792.

Shore D hardness is determined in accordance with ASTM D 2240, on specimens of 250 mil (6.4 mm) thickness, and the average of 4-5 measurements is recorded.

Flexural Modulus (3 point bend)—Flexural Modulus (2% secant modulus) is tested according to ASTM D790 with an INSTRON™ model 4201 tensile testing machine on crosslinked molded specimens with a nominal 125 mil (3.2 mm) thickness. The 3-point bend flexural modulus is conducted on a bar of rectangular cross section rested on two supports and loaded by means of a loading nose midway between the supports at 0.1 inches/minute (2.5 mm/min).

Melting point (also known as crystalline melting point), heat of fusion and crystallinity of polyethylene are determined by differential scanning calorimetry (DSC) in accordance with ASTM D3418.

Unsaturation content of polyethylene (including terminal vinyls per 1000 carbon atoms) is determined by Fourier Transform Infrared Spectroscopy (FTIR), as per the procedure described in U.S. Pat. No. 8,912,297 B2.

Dynamic oscillatory shear measurements are conducted over a range of 0.1 rad s$^{-1}$ to 100 rad s$^{-1}$ using a TA Instruments Advanced Rheometric Expansion System at a temperature of 120° C. or 135° C. and 0.25% strain, to determine the melt flow properties of polymers and peroxide containing compositions. The measurements at 100 rad s$^{-1}$ are representative of extrusion conditions.

Extensional Viscosity is measured using an ARES FCU Rheometer with Extensional Viscosity Fixture Geometry and TA Orchestrator software. The tests are run at a speed of 1/s at 120° C. or 135° C. to simulate extrusion conditions. The maximum ("peak") value of viscosity attained is reported, as well as the viscosity at Hencky Strain of 1 and the maximum Hencky strain.

Hot creep is measured to determine the degree of cure (crosslinking) and hot set is used to measure the sample relaxation after hot creep elongation. Testing is based on the ICEA-T-28-562-2003 method for power cable insulation materials. Hot creep testing is conducted on 50 mil (1.3 mm) thick samples in an oven with a glass door at 150° C. or 200° C. with a force of 0.2 MPa stress applied to the bottom of the specimens. Three test specimens for each sample are cut using ASTM D 412 type D tensile bars. The samples are elongated for 15 minutes where the percentage increases in length are measured and the average values of the three specimens are reported as "hot creep". The hot set values are obtained for the same samples undergoing hot-creep testing, after removing the load for 5 minutes under heat and cooling them at room temperature for 10 minutes. A sample is considered to have "failed" if it breaks during the test or yields hot creep >175%.

Moving Die Rheometer (MDR) analyses are performed on the compounds using Alpha Technologies Rheometer MDR model 2000 unit. Testing is based on ASTM procedure D 5289, "Standard Test Method for Rubber—Property Vulcanization Using Rotorless Cure Meters". The MDR analyses are performed using 6 grams of material. Samples are tested at 182° C. for 20 minutes or at 140° C. for 120 minutes at 0.5 degrees arc oscillation for both temperature conditions. Samples are tested on material directly from the BRABENDER™ mixing bowl.

Gel content (insoluble fraction) produced in ethylene plastics by crosslinking can be determined by extracting with the solvent decahydronaphthalene (decalin) according to ASTM D2765. It is applicable to cross-linked ethylene plastics of all densities, including those containing fillers, and all provide corrections for the inert fillers present in some of those compounds. The test is conducted on specimens that came out of the MDR experiments at 182° C. A WILEY mill is used (20 mesh screen) to prepare powdered samples, at least one gram of material for each sample. Fabrication of the sample pouches is crafted carefully to avoid leaks of the powdered samples from the pouch. In any technique used, losses of powder to leaks around the folds or through staple holes are to be avoided. The width of the finished pouch is no more than three quarters of an inch, and the length is no more than two inches. 120 mesh screens are used for pouches. The sample pouch is weighed on an analytical balance. 0.3 grams (+/−0.02 g) of powdered samples is placed into the pouch. Since it is necessary to pack the sample into the pouch, care is given not to force open the folds in the pouch. The pouches are sealed and samples are then weighed. Samples are then placed into one liter of boiling decahydronaphthalene (decalin), with 10 grams of 2,2'-methylene-bis (4-methyl-6-tertiary butyl phenol) for 6 hours using flasks in a heated mantle. After the (decalin) has boiled for six hours, the voltage regulator is turned off leaving the cooling water running until (decalin) has cooled below its flash point (this typically takes at least a half hour). When the (decalin) has cooled, the cooling water is turned off and the pouches removed from the flasks. The pouches are allowed to cool under a hood, to remove as much solvent as possible. Then the pouches are placed in a vacuum oven set at 150° C. for four hours, maintaining a vacuum of 25 inches of mercury. The pouches are then taken out of the oven and allowed to cool to room temperature. Weights are recorded on an analytical balance. The calculation for gel extraction is shown below where W1=weight of empty pouch, W2=weight of sample and pouch, W3=weight of sample, pouch and staple, and W4=weight after extraction.

$$\% \text{ extracted} = \left(\frac{W_3 - W_4}{W_2 - W_1}\right) \times 100$$

$$\text{Gel Content} = 100 - \% \text{ extracted}$$

Dissipation Factor (DF) and dielectric constant (DC) testing is conducted on cured 50 mil (1.3 mm) plaques. The plaques are degassed in a vacuum oven at 60° C. for five days. DF testing is carried out according to ASTM D150 at 60 Hz on a GUILDLINE High Voltage Capacitance Bridge unit, Model 9920A, with a TETTEX specimen holder and a TETTEX AG Instruments Temperature Control Unit. Samples are tested at 60 Hz and 2 kV applied stress at temperatures of 25° C., 40° C., 90° C., and 130° C.

AC Breakdown Strength (ACBD), also known as AC Dielectric Strength, is tested with nominal 35 mil (0.9 mm) thick cured plaques on a BRINKMAN AC Dielectric Strength Tester using EXXON Univolt N61 transformer oil. Aged samples are aged in a glass U-tube filled with 0.01 M sodium chloride solution for twenty one days at 6 kV.

GPC Method for measuring molecular weights of polyethylene: A Triple Detector Gel Permeation Chromatography (3D-GPC or TDGPC) system consisting of a Polymer-Char (Valencia, Spain) high temperature chromatograph GPC-IR, equipped with a 2-angle laser light scattering (LS) detector Model 2040 from Precision Detectors, now Agilent Technologies (CA, USA), and a 4-capillary solution viscometer (DP) from PolymerChar is used. Data collection is performed using Polymer Char "GPC One" software. The system is also equipped with an online solvent degassing device from Agilent Technologies.

High temperature GPC columns consisting of four 30 cm, 20 μm mixed ALS columns from Agilent Technologies are used. The GPC-IR autosampler oven is operated at 160° C., and the column compartment is operated at 150° C. The samples are prepared semi-automatically via dosing from the GPC-IR syringe at a concentration of 2 mg/ml with an including decane flowrate marker delivered via micropump. The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are shaken at 160° C. for three hours. The injection volume is 200 microliters. The flow rate through the GPC is set at 1.0 ml/minute.

Column calibration and sample molecular weight calculations are performed using Polymer Char "GPC One" software. Calibration of the GPC columns is performed with 21 narrow molecular weight distribution polystyrene standards obtained from Polymer Laboratories (now Agilent Technologies). The molecular weights of the polystyrene standards range from 580 to 8,400,000 g/mol and are arranged in 6 "cocktail" mixtures with at least a decade of separation between the individual molecular weights with individual concentrations ranging from 0.25 (Mp>500,000) to 0.5 mg/ml (Mp<500,000), dissolving for 24 hours in TCB at room temperature in a dark environment.

The peak molecular weights of polystyrene standards are converted to polyethylene molecular weights using the following equation (as described in Williams and Ward, J. Polym. Sci., Polym. Let., 6, 621 (1968)):

$$M_{polyethylene} = A(M_{polystyrene})^B$$

Here, B has a value of 1.0, and the experimentally determined value of A is 0.38 to 0.44.

The column calibration curve is obtained by fitting a first order polynomial to the respective polyethylene-equivalent calibration points obtained from the above Equation to the observed elution volumes.

The conventional number and weight-average molecular weights (Mn(conv) and Mw(conv), respectively) are calculated according to the following equations:

$$\overline{Mn} = \frac{\sum_i Wf_i}{\sum_i (Wf_i / M_i)}$$

$$\overline{Mw} = \frac{\sum_i (Wf_i * M_i)}{\sum_i Wf_i}$$

where, $Wf_i$ is the weight fraction of the i-th component and $M_i$ is the molecular weight of the i-th component. The molecular weight distribution (MWD) is expressed as the ratio of the weight average molecular weight (Mw) to the number average molecular weight (Mn).

The A value is determined by adjusting the A value in the Williams and Ward Equation until Mw, the weight average molecular weight, calculated using the above Equation, and the corresponding retention volume polynomial agreed with the independently determined value of Mw, obtained in accordance with a linear polyethylene homopolymer reference with known absolute weight-average molecular weight of 115,000 g/mol as measured by LALLS in a manner traceable to standard homopolymer polyethylene NBS1475.

The absolute weight average molecular weight (Mw(abs)) are characterized by the baseline-subtracted LS(15 degree angle) and IR-5 (measurement signal) concentration detectors using the following equation:

$$Mw(abs) = K_{LS} * \frac{\sum (LS_i)}{\sum (IR_i)}$$

wherein $\Sigma(LS_i)$ is the response area of the LS detector, $\Sigma(IR_i)$ is the response area of the IR-4 detector, and $K_{LS}$ is the instrument constant which was determined using a standard NIST 1475 with known concentration and certificated value for the weight average molecular weight of 52,000 g/mol.

The absolute molecular weight at each elution volume is calculated using the following equation:

$$M_{LS,i} = K_{LS} * \frac{LS_i}{IR_i}$$

wherein $K_{LS}$ is the determined instrument constant, $LS_i$ and $IR_i$ are the baseline-subtracted LS (15 degree) and IR5 (measurement) detector responses of the same i-th elution component.

The absolute number average and z average molecular weight are calculated with the following equations:

$$Mn(abs) = K_{LS} \frac{\sum (IR_i)}{\sum (IR_i) / \left(\frac{LS_i}{IR_i}\right)}$$

$$Mz(abs) = K_{LS} \frac{\sum IR_i * \left(\frac{LS_i}{IR_i}\right)^2}{\sum IR_i * \left(\frac{LS_i}{IR_i}\right)}$$

A linear extrapolation was performed on log $M_{LS,i}$-elution volume plot when the log $M_{LS,i}$ data scattered caused by low LS or IR detector responses.

Examples 1-7 and Comparative Examples 1-4

Sample Preparation

The compositions are shown in the Table. Two different grades of LDPE (available from The Dow Chemical Company) are used as Component A: one of 0.921 g/cc density (ASTM D792), melt index of 1.7 g/10 min (ASTM D1238), Mw (abs)/Mn (abs) of 8, and vinyls per 1000 carbon atoms of 0.3; and the other of 0.918 g/cc density (ASTM D792) and melt index of 8.0 g/10 min (ASTM D1238). For one of the comparative examples, an ethylene octene elastomeric copolymer with a density of 0.870 g/cc (ASTM D792), a melt index of 4.8 g/10 min (ASTM D1238) and available from The Dow Chemical Company is used.

Examples 1 to 2 and Comparative Examples 1 to 3

Dicumyl peroxide is melted by heating to 60° C. and mixed with Nofmer MSD (α-methyl styrene dimer) at a 5:1 ratio (of peroxide to Nofmer MSD). A "solids" mixture is made by mixing everything (except peroxide and Nofmer MSD) in a container by hand. This mixture is subsequently compounded in a 250 cc BRABENDER™ batch mixer with cam rotors at 190° C. and 40 rpm for 5 minutes. The blend is removed from the mixer, cold pressed into thin sheet, cut into strips and fed through a pelletizer to make pellets. The pellets are mixed in a 250 cc BRABENDER™ mixing bowl with cam rotors at 120° C. and 30 rpm for 10 minutes (after loading), with the peroxide/Nofmer MSD mixture being added 2 minutes into this step. Samples are removed from the mixer, cold-pressed and evaluated as such (or compression molded to various thicknesses for testing).

Examples 3 to 7 and Comparative Example 4

Dicumyl peroxide is melted by heating to 60° C. and mixed with Nofmer MSD at a 5:1 ratio (of peroxide to Nofmer MSD). A "solids" mixture is made by mixing everything (except peroxide and Nofmer MSD) in a container by hand. This mixture is subsequently compounded in a 250 cc BRABENDER™ batch mixer with cam rotors at 190° C. and 40 rpm for 5 minutes. The blend is removed from the mixer, cold pressed into thin sheet, cut into strips and fed through a pelletizer to make pellets. The polymer pellets are heated in a glass jar at 50° C. for 2 hours and subsequently sprayed with stipulated amount of peroxide/AMSD mixture using a syringe. The jar is tumble blended for 10 minutes at room temperature, and placed at 50° C. for 16 hours. Next, the contents of the jar are mixed in a 250 cm³ BRABENDER™ mixing bowl with cam rotors, at 120° C. and 30 rpm for 10 minutes (after loading). Samples are removed from the mixer, cold-pressed and evaluated as such (or compression molded to various thicknesses for testing).

Testing

The compositions are tested in a moving die rheometer at 140° C. or 182° C. (for evaluation of crosslinking characteristics). For melt rheological measurements, the compositions are compression molded at the following conditions to prevent significant crosslinking: 500 psi (3.5 MPa) at 120° C. for 3 minutes, followed by 2500 psi (17 MPa) at this temperature for 3 minutes, cooling to 30° C. at this pressure, and opening the press to remove the molded plaque. For electrical and mechanical measurements, the compositions are compression molded at the following conditions to make completely crosslinked specimens of different dimensions: 500 psi (3.5 MPa) at 125° C. for 3 minutes, followed by 2500 psi (17 MPa) at 180° C. for 20 minutes, cooling to 30° C. at this pressure, and opening the press to remove the molded plaque.

PROPERTIES

The properties of the compositions are given in the following Table. Examples 1 to 7 exhibit higher extensional viscosities at Hencky strain of 1 than their respective comparative examples (for increased sag-resistance at extrusion conditions), combined with shear viscosities at 100 rad s$^{-1}$ and 120° C. or 135° C.≤1600 Pa s (for extrusion processability) and ts1 at 140° C.≥30 min (for resistance to premature crosslinking during extrusion). The maximum permissible loading of polypropylene to keep the shear viscosity at 100 rad s$^{-1}$≤1600 Pa s (at 120° C. or 135° C.) is 13 wt % (i.e., less than 14 wt %). Furthermore, even as little as 1 wt % of polypropylene in the composition yielded significant enhancement in melt extensional viscosity (while minimizing the increases in flexural modulus and/or melt shear viscosity).

TABLE 1

| Compositions and Properties | | | | | | |
|---|---|---|---|---|---|---|
| | Example 1 | Example 2 | Example 3 | Example 4 | Example 5 | Example 6 |
| Composition (wt %) | | | | | | |
| Component A: LDPE (2 I$_2$) | 88.23 | | 95.72 | 93.72 | 91.72 | 87.72 |
| Component A: LDPE (8 I$_2$) | | 88.23 | | | | |
| Polyolefin Elastomer of Crystallinity < 40% | | | | | | |
| Component B: Braskem FF018F Polypropylene | 8.78 | 8.78 | 1.00 | 3.00 | 5.00 | 9.00 |
| Component C: Perkadox BC-FF Dicumyl Peroxide | 1.80 | 1.80 | 1.80 | 1.80 | 1.80 | 1.80 |
| PEG 20000 (Clariant Polyglykol 20000 SRU) | 0.29 | 0.29 | 0.58 | 0.58 | 0.58 | 0.58 |
| Lowinox TBM-6 | 0.34 | 0.34 | 0.34 | 0.34 | 0.34 | 0.34 |
| Sabostab UV 119 | 0.20 | 0.20 | 0.20 | 0.20 | 0.20 | 0.20 |
| Nofmer MSD (AMSD) | 0.36 | 0.36 | 0.36 | 0.36 | 0.36 | 0.36 |
| Total | 100.00 | 100.00 | 100.00 | 100.00 | 100.00 | 100.00 |
| Properties Without Crosslinking | | | | | | |
| Shear viscosity (Pa s) at 100 rad s$^{-1}$ and 120° C. | 1180 | 657 | Not Measured | Not Measured | Not Measured | Not Measured |

TABLE 1-continued

| Compositions and Properties | | | | | | |
|---|---|---|---|---|---|---|
| Shear viscosity (Pa s) at 100 rad s$^{-1}$ and 135° C. | Not Measured | Not Measured | 844 | 908 | 932 | 1090 |
| Extensional viscosity at 120° C., 1/s and Hencky Strain of 1 (poise) | 4.45E+06 | 1.25E+06 | Not Measured | Not Measured | Not Measured | Not Measured |
| Extensional viscosity at 135° C., 1/s and, Hencky Strain of 1 (poise) | Not Measured | Not Measured | 5.43E+05 | 7.50E+05 | 1.10E+06 | 2.77E+06 |
| Maximum extensional viscosity at 135° C. and 1/s (poise) | Not Measured | Not Measured | 1.66E+07 | 6.17E+06 | 3.44E+06 | 2.94E+06 |
| Maximum Hencky Strain at 135° C. and 1/s | Not Measured | Not Measured | 3.9 | 3.5 | 2.8 | 1.1 |
| Properties After Crosslinking | | | | | | |
| Density (g/cm$^2$) | 0.92 | 0.92 | Not Measured | Not Measured | Not Measured | Not Measured |
| Hardness (Shore D) | 45 | 46 | 44.0 | 43.0 | 42.5 | 44.8 |
| Flexural Modulus, 2% Secant (MPa) | Not Measured | Not Measured | 165 | 169 | 175 | 192 |
| MDR: ts1 at 140° C. (minutes) | 52 | Not Measured | 56.8 | 50.2 | 47.4 | 43.5 |
| MDR: MH-ML at 182° C. (lb in) | 2.3 | Not Measured | 3.53 | 3.41 | 3.24 | 3.06 |
| Gel content (wt %) after crosslinking | 76 | Not Measured | 86 | 86 | 86 | 85 |
| Hot creep (200° C., 20N), %, after crosslinking | 50 | 57 | 49 | 50 | 52 | 50 |
| DF at 130° C., 60 Hz (%) after crosslinking | 0.15 | 0.09 | 0.09 | 0.07 | 0.05 | 0.08 |
| AC Breakdown Strength—unaged (kV/mm) | 36 | 36 | 36 | 36 | 36 | 36 |
| AC Breakdown Strength—aged (kV/mm) | 36 | 32 | Not Measured | Not Measured | Not Measured | Not Measured |

| | Example 7 | Comparative Example 1 | Comparative Example 2 | Comparative Example 3 | Comparative Example 4 |
|---|---|---|---|---|---|
| Composition (wt %) | | | | | |
| Component A: LDPE (2 I$_2$) | 83.72 | 97.01 | | | 96.72 |
| Component A: LDPE (8 I$_2$) | | | 97.01 | | |
| Polyolefin Elastomer of Crystallinity < 40% | | | | 88.23 | |
| Component B: Braskem FF018F Polypropylene | 13.00 | | | 8.78 | |

TABLE 1-continued

| Compositions and Properties | | | | | |
|---|---|---|---|---|---|
| Component C: Perkadox BC-FF Dicumyl Peroxide | 1.80 | 1.80 | 1.80 | 1.80 | 1.80 |
| PEG 20000 (Clariant Polyglykol 20000 SRU) | 0.58 | 0.29 | 0.29 | 0.29 | 0.58 |
| Lowinox TBM-6 | 0.34 | 0.34 | 0.34 | 0.34 | 0.34 |
| Sabostab UV 119 | 0.20 | 0.20 | 0.20 | 0.20 | 0.20 |
| Nofmer MSD (AMSD) | 0.36 | 0.36 | 0.36 | 0.36 | 0.36 |
| Total | 100.00 | 100.00 | 100.00 | 100.00 | 100.00 |
| Properties Without Crosslinking | | | | | |
| Shear viscosity (Pa s) at 100 rad s$^{-1}$ and 120° C. | Not Measured | 617 | 527 | 1800 | Not Measured |
| Shear viscosity (Pa s) at 100 rad s$^{-1}$ and 135° C. | 1540 | Not Measured | Not Measured | Not Measured | 746 |
| Extensional viscosity at 120° C., 1/s and Hencky Strain of 1 (poise) | Not Measured | 7.28E+05 | 2.39E+05 | 2.34E+06 | Not Measured |
| Extensional viscosity at 135° C., 1/s and, Hencky Strain of 1 (poise) | 2.30E+06 | Not Measured | Not Measured | Not Measured | 4.70E+05 |
| Maximum extensional viscosity at 135° C. and 1/s (poise) | 8.03E+06 | Not Measured | Not Measured | Not Measured | 3.51E+06 |
| Maximum Hencky Strain at 135° C. and 1/s | 2.9 | Not Measured | Not Measured | Not Measured | 3.6 |
| Properties After Crosslinking | | | | | |
| Density (g/cm$^2$) | Not Measured | 0.92 | 0.92 | 0.88 | Not Measured |
| Hardness (Shore D) | 46.1 | 49 | 44 | 30 | 46.0 |
| Flexural Modulus, 2% Secant (MPa) | 218 | Not Measured | Not Measured | Not Measured | 159 |
| MDR: ts1 at 140° C. (minutes) | 33.5 | 68 | Not Measured | 25 | 54.2 |
| MDR: MH-ML at 182° C. (lb in) | 2.73 | 3.0 | Not Measured | 4.6 | 3.56 |
| Gel content (wt %) after crosslinking | 83 | 84 | Not Measured | 96 | 86 |
| Hot creep (200° C., 20N), %, after crosslinking | 54 | 35 | 64 | 27 | 49 |
| DF at 130° C., 60 Hz (%) after crosslinking | 0.10 | 0.09 | 0.08 | 0.16 | 0.13 |

TABLE 1-continued

| Compositions and Properties | | | | | |
|---|---|---|---|---|---|
| AC Breakdown Strength—unaged (kV/mm) | 36 | 36 | 36 | 34 | 37 |
| AC Breakdown Strength—aged (kV/mm) | Not Measured | 29 | 31 | 33 | Not Measured |

What is claimed is:

1. A composition comprising, in weight percent based on the weight of the composition:
   (A) 85 to 99% low density polyethylene (LDPE) having a crystallinity of greater than 40%;
   (B) 1 to less than 14% propylene polymer having an upper melting point of greater than or equal to (≥) 130° C.; and
   (C) ≥0.5% peroxide.

2. The composition of claim 1 in which the LDPE is a high pressure LDPE made by a polymerization process that includes the use of a tubular reactor.

3. The composition of claim 2 in which the propylene polymer is an impact copolymer polypropylene.

4. The composition of claim 2 in which the propylene polymer is an isotactic polypropylene homopolymer.

5. The composition of claim 1 further comprising a compatibilizer.

6. The composition of claim 1 free of a compatibilizer.

7. A crosslinked insulation sheath for a cable, the crosslinked insulation sheath made from a composition comprising in weight percent based on the weight of the composition;
   (A) 85 to 99% low density polyethylene (LDPE) having a crystallinity of greater than 40%;
   (B) 1 to less than 14% propylene polymer having an upper melting point of greater than or equal to (≥) 130° C.; and
   (C) ≥0.5% peroxide.

8. A cable comprising an insulation sheath of claim 7.

* * * * *